UNITED STATES PATENT OFFICE.

HUGH F. JONES, OF LOS ANGELES, CALIFORNIA.

PROCESS OF MAKING STEEL CASTINGS OUT OF STEEL-SCRAP.

967,780.

Specification of Letters Patent. Patented Aug. 16, 1910.

No Drawing. Application filed October 12, 1909. Serial No. 522,251.

*To all whom it may concern:*

Be it known that I, HUGH F. JONES, a citizen of the United States, residing in the city and county of Los Angeles, State of California, have invented a new and useful Process for Making Steel Castings out of Steel-Scrap Melted in an Ordinary Foundry-Cupola, of which the following is a specification.

My invention relates to a process for melting steel scrap in an ordinary foundry cupola, and the object thereof is to utilize the melted steel in the production of new steel castings whereby waste steel scrap heretofore considered useless may be put to a useful purpose.

In carrying out my process I charge the cupola with alternate layers of coke and flux and steel scrap, using the following ratio; for 48 hour coke, 7 pounds of steel to 1 of coke; with 60 hour coke, 9 pounds of steel to one of coke; with 72 hour coke, 10 pounds of steel to one of coke. When the castings are required to be machined only open hearth steel should be used. The smallest pieces of steel scrap are placed on the top of each layer of coke as the cupola is charged and the largest pieces of scrap should be placed on the top of the last charge of coke. I prefer to use coarse coke instead of fine and to have pieces of steel scrap not larger than from 20 to 25 pounds, but pieces as large as 100 pounds may be used when laid on top of the last charge. If no machine work in required on the casting, 75% of the charge of steel can be Bessemer steel stock to give the casting hardness. 25% of open hearth steel is used to give the castings toughness. When charging the furnace I scatter upon each layer of coke flux, sold in the market as Kirk's Compound, in the ratio of ten pounds of the compound to each ton of steel when the coke contains 2% sulfur. For each 1% or fraction thereof of sulfur over or under 2% one pound or fraction thereof of the compound is added or deducted. This flux should be mixed with water similar to molding sand before applying the same upon the coke. The first layer of coke is placed in the cupola and the flux is scattered on the same, a layer of steel of about 500 pounds is then placed upon the top of the coke and as soon as the steel has become red hot a second layer of coke is placed in the cupola and after flux has been applied to the coke, a second layer of steel is placed thereon. As soon as this steel has become red hot the process of adding other layers of coke and flux and steel is repeated until the cupola is fully charged. Before commencing to charge the furnace an analysis of the coke should be made to determine the amount of fixed carbon and sulfur contained therein. The blast used on the furnace should be as follows, where the coke contains 70% of fixed carbon, an eight ounce pressure should be used. For each 5% of fixed carbon in the coke above 70% the blast pressure should be decreased one ounce, and for each 5% of fixed carbon below 70% the blast pressure should be increased one ounce. While the steel is being melted I place a quantity of aluminum in the ladle into which the molten steel is to be poured equal to .05% by weight of the molten metal, and also one half pound of ferromanganese per 100 pounds of metal. Careful watch should be kept of the cupola and as soon as the well is full of molten metal it should be immediately tapped out into the ladle and care must be taken to prevent slag from getting into the ladle. The molten metal is then poured into the molds in the usual manner.

Kirk's Compound, hereinbefore referred to, is composed of the following ingredients: silica 67.70%; iron oxid 8.10%; alumina oxid, trace; calcium sulfate 1.46%; magnesium sulfate 1.44%; coal, semibituminous 2.00%; moisture 8.91%; sodium carbonate 6.56%; sodium chlorid 1.19%; organic matter 2.47% extracted from the coal by alkalies. Of the ingredients of which said Kirk's Compound is composed, only the silica and iron oxid need be used.

In the foregoing description I have described the best process which I have found in practice. But it is obvious that the process admits of variations above and below the ratios stated.

Having described my invention what I claim is;

1. The herein described process of utilizing scrap steel for making steel castings in a cupola furnace consisting of charging a cupola furnace with a layer of coke treated with flux and placing a layer of steel scrap thereon and after the steel has become red hot placing thereon a second layer of coke treated with flux, and then another layer of steel scrap and after the same becomes red hot, repeating the process until the cupola is fully charged; applying a blast to the cupola during the process of charging and while the steel is melting, preparing a ladle with aluminum and ferromanganese placed therein and then pouring the molten steel into the ladle, and then pouring the molten metal into molds substantially as described herein.

2. The herein described process of utilizing scrap steel for making castings in a cupola furnace consisting of charging a cupola furnace with alternate layers of coke treated with flux, and layers of scrap steel, the ratio of coke to steel being one pound of coke to from seven to ten pounds of steel, each layer of coke and steel being consecutively brought to a red heat, and applying a blast during the charging and melting to the cupola.

In witness that I claim the foregoing I have hereunto subscribed my name this 7th day of October, 1909.

HUGH F. JONES.

Witnesses:
G. E. HARPHAM.
S. B. AUSTIN.